US011974559B2

(12) United States Patent
Hanson et al.

(10) Patent No.: US 11,974,559 B2
(45) Date of Patent: May 7, 2024

(54) FISHING AID

(71) Applicants: Mathew Sherman Hanson, Elgin, IL (US); Jerry DeVries, Sandwich, IL (US)

(72) Inventors: Mathew Sherman Hanson, Elgin, IL (US); Jerry DeVries, Sandwich, IL (US)

( * ) Notice: Subject to any disclaimer, the term of this patent is extended or adjusted under 35 U.S.C. 154(b) by 499 days.

(21) Appl. No.: 17/301,014

(22) Filed: Mar. 22, 2021

(65) Prior Publication Data
US 2022/0295770 A1    Sep. 22, 2022

(51) Int. Cl.
*A01K 91/08*    (2006.01)

(52) U.S. Cl.
CPC .................... *A01K 91/08* (2013.01)

(58) Field of Classification Search
CPC .............. A01K 91/08; A01K 85/1893; A01K 85/1863; A01K 85/1807; A01K 85/1871; A01K 85/1877; A01K 85/1841; B63B 1/24; B63B 1/26
USPC .... 43/43.13, 26.1–26.2, 42.02–42.03, 42.11, 43/42.13–42.14, 42.22–42.23, 42.47; 114/271, 274, 278
See application file for complete search history.

(56) References Cited

U.S. PATENT DOCUMENTS

| | | | | |
|---|---|---|---|---|
| 1,372,749 A * | 3/1921 | Hafstrom | ................. | B63H 1/38 114/271 |
| 1,390,601 A * | 9/1921 | Caldwell | ................ | A01K 85/18 43/42.3 |
| 2,472,505 A * | 6/1949 | Yocam | .................... | A01K 85/16 74/54 |
| 2,498,352 A * | 2/1950 | Bergman | ................ | A01K 85/16 43/26.2 |
| 2,516,133 A * | 7/1950 | Martin | .................... | A01K 85/18 43/26.2 |
| 2,607,151 A * | 8/1952 | Morris | .................... | A01K 85/18 43/42.3 |
| 2,704,416 A * | 3/1955 | Laird | ...................... | A63H 23/10 43/3 |
| 2,737,748 A * | 3/1956 | Krozaleski | ............. | A01K 85/16 43/26.2 |
| 2,789,386 A * | 4/1957 | Creelman | .............. | A01K 91/08 43/42.22 |
| 3,091,895 A * | 6/1963 | Stopek | ................... | A63H 23/04 446/162 |
| 3,791,064 A * | 2/1974 | Van Iseghem, Jr. | ... | A01K 85/18 43/26.2 |
| 4,028,839 A * | 6/1977 | Stubblefield | ............ | G07F 17/00 43/43.13 |

(Continued)

*Primary Examiner* — Peter M Poon
*Assistant Examiner* — Hae Rie Jessica Byun (57) ABSTRACT

A fishing aid includes a housing with a hollow interior, an actuator being coupled to the housing, and an elevator. The elevator being in a pivotal connection with the housing and being in a coupling connection with the actuator, such that the elevator is configured, through the actuator, for a reciprocally pivotal movement in a vertical direction when the fishing aid is being pulled in a linear direction through a body of water by a line connected to the housing. The reciprocal pivotal movement of the elevator causes a movement of the fishing aid in a non-linear pattern through the body of water. The fishing aid can be used on a surface of the body of water or can be fully submerged with an aid of a downrigger.

13 Claims, 9 Drawing Sheets

(56) References Cited

U.S. PATENT DOCUMENTS

| | | | | |
|---|---|---|---|---|
| 4,509,287 | A | * | 4/1985 | Hood ..................... A01K 91/08 43/43.11 |
| 4,581,841 | A | * | 4/1986 | Gish ...................... A01K 85/16 43/42.03 |
| 4,831,767 | A | * | 5/1989 | Pearce .................. A01K 85/18 43/42.3 |
| 4,903,428 | A | * | 2/1990 | Sluiter ................. A01K 91/065 43/26.1 |
| 5,924,236 | A | * | 7/1999 | Preston |
| 5,931,715 | A | * | 8/1999 | Chang .................... A63H 13/02 446/353 |
| 6,000,165 | A | * | 12/1999 | Van Iseghem, Jr. ... A01K 85/16 43/42.32 |
| 6,948,274 | B1 | * | 9/2005 | Sharp ..................... A01K 85/16 43/42.22 |
| 2005/0042970 | A1 | * | 2/2005 | Schwartz ............. A63H 23/005 446/154 |
| 2007/0107294 | A1 | * | 5/2007 | Tsai ........................ B63H 1/38 114/271 |

\* cited by examiner

FISHING AID

CROSS REFERENCE

This application is an original, non-provisional, utility application that claims no benefit nor priority.

TECHNICAL FIELD

The subject matter relates to fishing aids. It further relates to a fishing aid that is configured to move in a non-linear pattern when being pulled in a linear direction.

BRIEF DESCRIPTION OF DRAWINGS

Non-limiting and non-exhaustive examples of several of the various embodiments of the present subject matter are described with references to the following figures, and reference numbers refer to the same features throughout the various views and embodiments unless otherwise specified.

Corresponding reference characters indicate corresponding components throughout the several views of the drawings. Skilled artisans will appreciate that elements in the figures are illustrated for simplicity and clarity and have not necessarily been drawn to scale. Also, common but well-understood elements that are useful or necessary in a commercially feasible embodiment are often not depicted in order to facilitate a less obstructed view of these various embodiments. Additionally, the disclosed architecture is sufficiently configurable, such that it may be utilized in ways other than what is shown.

DETAILED DESCRIPTION

In this Specification, which includes the figures, claims, and this detailed description, reference is made to particular and possible features of the embodiments of the subject matter, including method steps. These particular and possible features are intended to include all possible combinations of such features, without exclusivity. For instance, where a feature is disclosed in a specific embodiment or claim, that feature can also be used, to the extent possible, in combination with and/or in the context of other aspects and embodiments of the subject matter, and in the subject matter generally. Additionally, the disclosed architecture is sufficiently configurable, such that it may be utilized in ways other than what is shown.

The purpose of the Abstract of this Specification is to enable the U.S. Patent and Trademark Office and the public generally, and especially the scientists, engineers and practitioners of the art who are not familiar with patent or legal terms or phrasing, to determine quickly from a cursory inspection the nature and essence of the technical disclosure of the application. The Abstract is not intended to be limiting as to the scope of the subject matter in any way.

In the following description, numerous specific details are given in order to provide a thorough understanding of the present embodiments. It will be apparent, however, to one having ordinary skill in the art, that the specific detail need not be employed to practice the present embodiments. On other instances, well-known materials or methods have not been described in detail in order to avoid obscuring the present embodiments. When limitations are intended in this Specification, they are made with expressly limiting or exhaustive language.

Reference throughout this Specification to "one embodiment", "an embodiment", "one example" or "an example" means that a particular feature, structure, or characteristic described in third member with the embodiment or example is included in at least one embodiment of the present embodiments. Thus, appearances of the phrases "in one embodiment", "according to an embodiment", "in an embodiment", "one example", "for example", "an example", or the like, in various places throughout this Specification are not necessarily all referring to the same embodiment or example. Furthermore, the particular features, structures, or characteristics may be combined in any suitable combinations and/or sub-combinations in one or more embodiments or examples.

The terms "comprises", "comprising", "includes", "including", "has", "having", "could", "could have" or their grammatical equivalents, are used in this Specification to mean that other features, components, materials, steps, etc. are optionally present as a non-exclusive inclusion. For instance, a device "comprising" (or "which comprises") components A, B, and C can contain only components A, B, and C, or can contain not only components A, B, and C but also one or more other components. For example, a method comprising two or more defined steps can be carried out in any order or simultaneously, unless the context excludes that possibility; and the method can include one or more other steps which are carried out before any of the defined steps, between two of the defined steps, or after all the defined steps, unless the context excludes that possibility.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

Examples or illustrations given are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these example or illustrations are utilized will encompass other embodiments, which may or may not be given in this Specification, and all such embodiments are intended to be included within the scope of that term or terms. Language designating such nonlimiting examples and illustrations includes, but is not limited to: "for example", "for instance", "etc.", "or otherwise", and "in one embodiment."

The phrase "at least" followed by a number is used to denote the start of a range beginning with that number, which may or may not be a range having an upper limit, depending on the variable defined. For instance, "at least 1" means 1 or more.

In this specification. "a" and "an" and similar phrases are to be interpreted as "at least one" and "one or more." In this specification, the term "may" or "can be" or "could be" is to be interpreted as "may, for example." In other words, the term "may" is indicative that the phrase following the term "may" is an example of one of a multitude of suitable possibilities that may, or may not, be employed to one or more of the various embodiments.

The term "couple" or "coupled" when used in this specification and appended claims refers to an indirect or direct physical third member between the identified elements, components, or objects. Often the manner of the coupling will be related specifically to the manner in which the two coupled elements interact.

The term "directly coupled" or "coupled directly," when used in this specification and appended claims, refers to a physical third member between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," "releaseably attached", "detachably attached", "detachably connected" and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The verb "may" is used to designate optionality/non compulsoriness. In other words, something that "may" can, but need not.

The phrase "a plurality of" followed by a feature, component, or structure is used to mean more than one, specifically including a great many, relative to the context of the component.

It is the applicant's intent that only claims that include the express language "means for" or "step for" be interpreted under 35 U.S.C. § 112. Claims that do not expressly include the phrase "means for" or "step for" are not to be interpreted under 35 U.S.C. § 112.

If the provisions of 35 USC § 112 6 are desired to be invoked in any apparatus claim associated herewith, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112 6 are not intended to be invoked for that claim.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purpose required by law, but otherwise reserves all copyright rights whatsoever.

The present disclosure generally teaches devices, assemblies and methods directed to fishing aids. The fishing aid is configured to move in a non-linear pattern when being pulled in a linear direction.

Now in a reference to FIGS. 1-12B, a fishing aid 10 comprises a housing 20, an actuator 70, and an elevator 100. The actuator 70 is being coupled to the housing 20. The elevator 100 is being in a pivotal connection 114 with the housing 20 and being in a coupling connection 130 with the actuator 70. The elevator 100 is configured, through the actuator 70, to move in a reciprocally pivotal movement in a vertical direction when the fishing aid 10 is being pulled in a linear direction through a body of water 2. Furthermore, the reciprocal pivotal movement of the elevator 100 causes a movement of the fishing aid 10 in a non-linear pattern through the body of water 2 by a line 168 connected to the housing 20.

Figure 5:
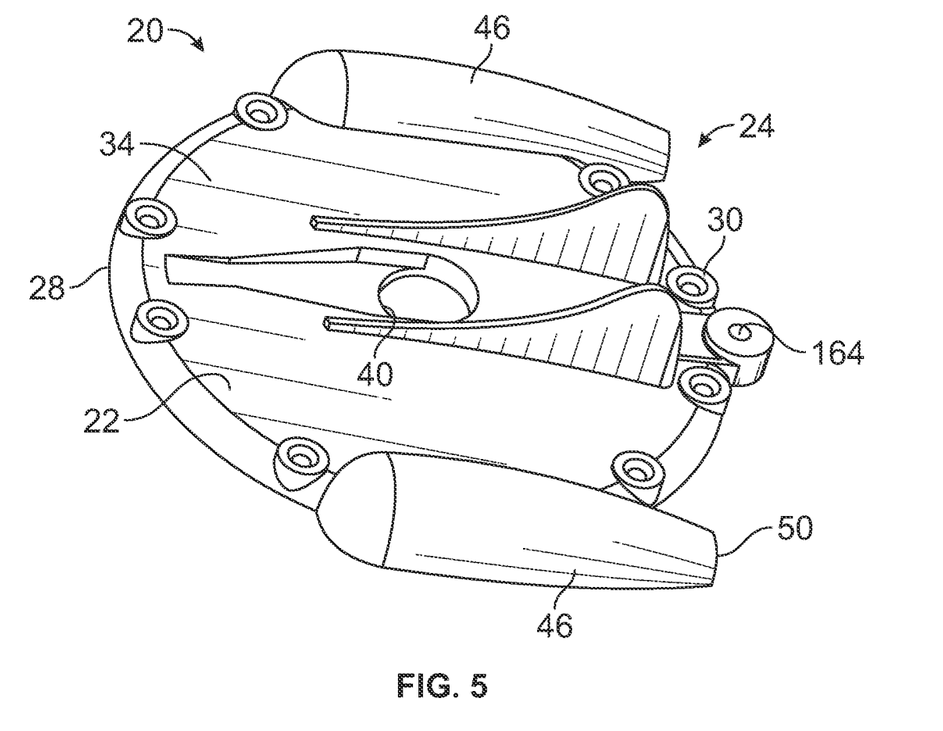
FIG. 5 illustrates a perspective view of one housing half employed within the fishing aid of FIGS. 1-4.
Figure 6:
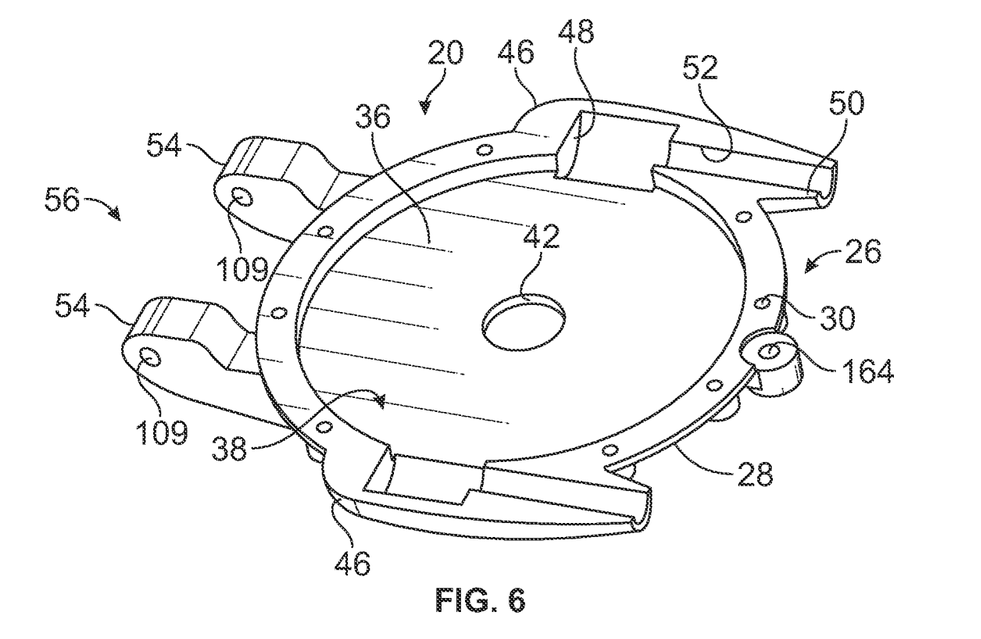
FIG. 6 illustrates a perspective view of another housing half employed within the fishing aid of FIGS. 1-4.

The housing 20 comprises a wall 22. As is illustrated in FIGS. 5-6, the wall 22 may be provided by a pair of wall halves 24 and 26. The wall halves 24 and 26 are joined therebetween at the peripheral edge 28 either by illustrated fastening apertures 30 and fasteners 32 or by any other suitable method, for example such as an adhesive or melding. One of such wall halves, for example such as wall half 24, defines an upper wall half during use of the fishing aid 10. The other wall half 26 defines a lower half during use of the fishing aid 10. The wall 22 has an exterior surface 34 and an interior surface 36. The wall 22 also defines a hollow interior 38 of the housing 20. For the reasons to be understood later in this document, the upper wall half 24 comprises a central aperture 40, the lower wall half 26 comprises a central bore 42 that is aligned with the central aperture 40 along an axis 44 and two extensions 46 that are disposed at a distance from each other about the peripheral edge 28. As the housing 20 is illustrated as having a generally circular shape, the extensions 46 are disposed diametrically opposite from each other. Each extension 46 has an inner opening 48 in an open communication with the hollow interior 38, an outer opening 50 in an open communication with the exterior surface 34 and an inner bore 52 that is disposed between the inner opening 48 and outer opening 50. It would be understood that these extensions 46 are features (or components) of the wall 22. The cross-sectional size of the inner opening 48 may be sized larger than a cross-sectional size of the inner bore 52. The housing 20 further comprises two flanges 54. The two flanges 54 upstand on the exterior surface 34 and are spaced apart from each other to define a gap 56. Finally, the housing 20 comprises connections with a fishing implement and a lure connection 164. The connection 58 with a lure can be a line aperture 58 within the wall 22. The line aperture 58, when provided, allows for a line to be tied to the housing 20.

The actuator 70 comprises two propellers 72. Now in a particular reference to FIG. 8, each propeller 72 from the two propellers 72 comprises a gear engaging portion 74. The gear engaging portion 74 is positioned within the inner opening 48 and comprises teeth 76. The teeth 76 extend into the hollow interior 38. In other words, it can be seen that the gear engaging portion 74 is disposed within the hollow interior 38. Each propeller 72 also comprises a middle portion 78 extending from the gear engaging portion 74. The middle portion 78 is being mounted for a rotation within the inner bore 52. The inner bore 52 can be also referred to as a portion of the hollow interior 38. Each propeller 72 further comprises a helix-shaped portion 82 extending from the middle portion 78 and extending outwardly from the housing 20 through the outer opening 50. The helix-shaped portion 82 being disposed in a rear of the housing 20 during use of the fishing aid 10. The helix-shaped portion 82 comprises one or more fins 84. Each of the two fins 84 may comprise a flute shape. The helix-shaped portion 82 are so configured that, during use of the fishing aid 10, a gear engaging portion 74 of a first propeller 72 rotates in a direction being opposite to a direction of rotation of a gear engaging portion 74 of a second propeller 72.

Figure 7:
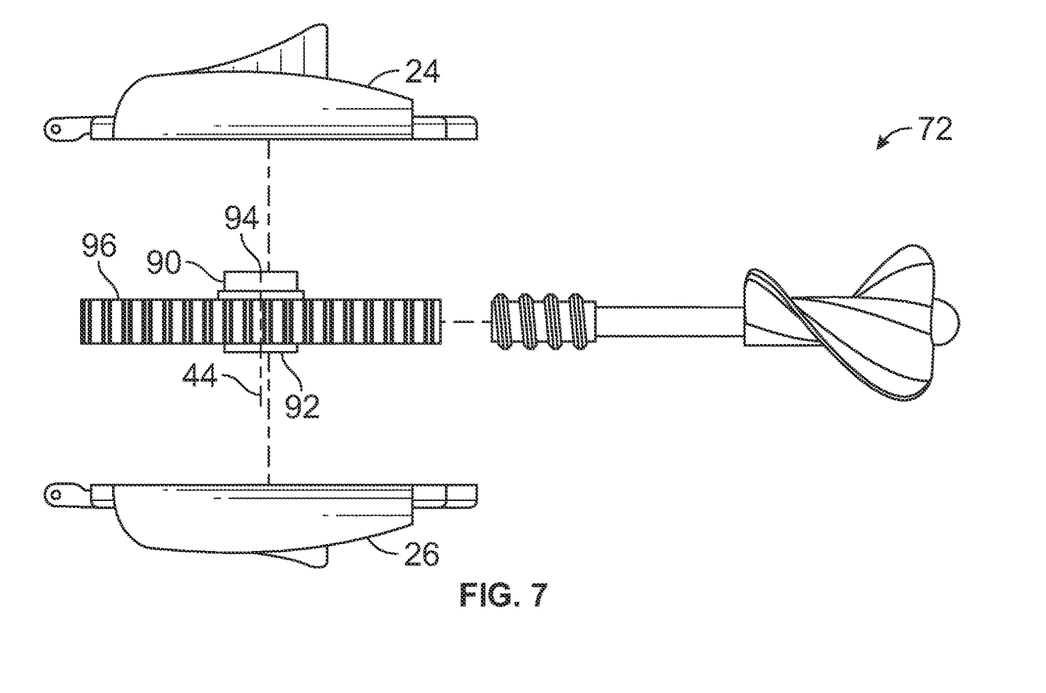
FIG. 7 illustrates an exploded side view of the fishing aid of FIGS. 1-4.
Figure 8:
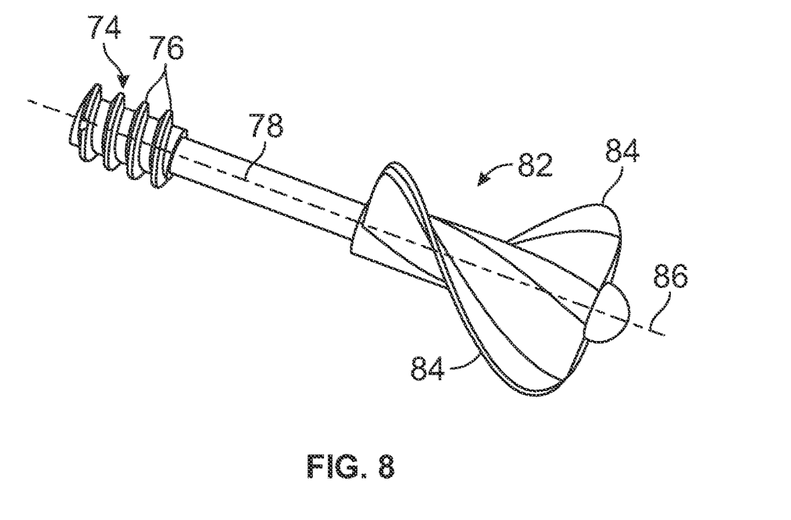
FIG. 8 illustrates a perspective view of a propeller employed within the fishing aid of FIGS. 1-4.
Figure 9:
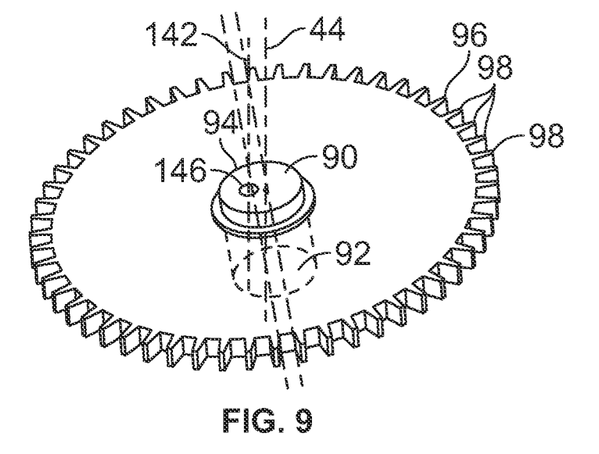
FIG. 9 illustrates a perspective view of a gear employed within the fishing aid of FIGS. 1-4.

Now in a reference to FIGS. 7 and 9, the actuator 70 further comprises a shaft 90 disposed within the hollow interior 38 of the housing 20. One end 92 of the shaft 90 is received within the central bore 42, while the opposite end 94 of the shaft 90 is received within the central aperture 40. This shaft 90 can further be a crank shaft configuration when an eccentric connection is embodied, as described below. There is also a gear 96 being mounted for a rotation on the shaft 90 within the hollow interior 38 about the axis 44. The gear 96 is coaxial with shaft 90. The gear 96 comprises a disk-shaped body and gear teeth 98 on a peripheral edge surface of the disk-shaped body. The gear engaging portion 74 is configured to engage the teeth 98. In other words, the teeth 76 of the gear engaging portion 74 mesh with the teeth 98. In an example, the gear 96 and the shaft 90 can be provided as a unitary one-piece member. In an example, the gear 96 can be provided separately from the shaft 90 and being adapted with a central aperture (not shown) that is sized and shaped to receive the exterior surface of the shaft 90 therewithin. Each propeller 72 defines an axis 86. Such axis 86 is also a rotational axis 95 of the propeller 72.

The gear 96 is positioned within the middle of the housing 20, keeping weight and buoyancy forces located as close as possible to the center mass of the fishing aid. In other words, weight and buoyancy forces from the gear 96 and the shaft 90 are then located as close as possible to the central horizontal axis. This enables the axis 44 of the shaft 90 to define a central axis of the fishing aid 10. The axis 86 of each propeller 72 is co-planer with actuator top plane. This ensures the propeller's weight and buoyancy forces are centered on the actuator top plane to prevent rolling of the fishing aid.

In operation (or during use), as the fishing aid 10 is pulled through the body of water 2, in a linear direction, the reaction from the water with the fins 84 of each helix-shaped portion 82 causes each middle portion 78 to rotate and further causes a rotation of the gear 96 through the engagement of the teeth 76 with the teeth 98. The gear 96 causes a like rotation of the shaft 90. Thus, the helix-shaped portion 82 is configured and operable to generate a rotation of each propeller 72 and a rotation of the gear engaging portion 74 due to a reaction with the body of water 2 while being pulled through the body of water 2 in the linear direction when the fishing aid 10 is being submerged in the body of water 2 and while being pulled through the body of water 2 in such linear direction. It will be also understood that the actuator 70 is configured to harness an energy of the moving water. The term "submerged" when used in this specification and appended claims refers to fishing aid 10 being either partially submerged or being fully submerged. When the fishing aid 10 is being partially submerged, the fishing aid 10 is essentially floating on the surface 4 of the body of water 2. When the fishing aid 10 is being fully submerged, the fishing aid 10 is disposed below the surface 4 of the body of water 2. Furthermore, when the fishing aid 10 is being partially submerged, the term "through the body of water" when used in this specification and appended claims refers to fishing aid 10 being pulled on the surface 4 of the body of water 2.

Figure 10:
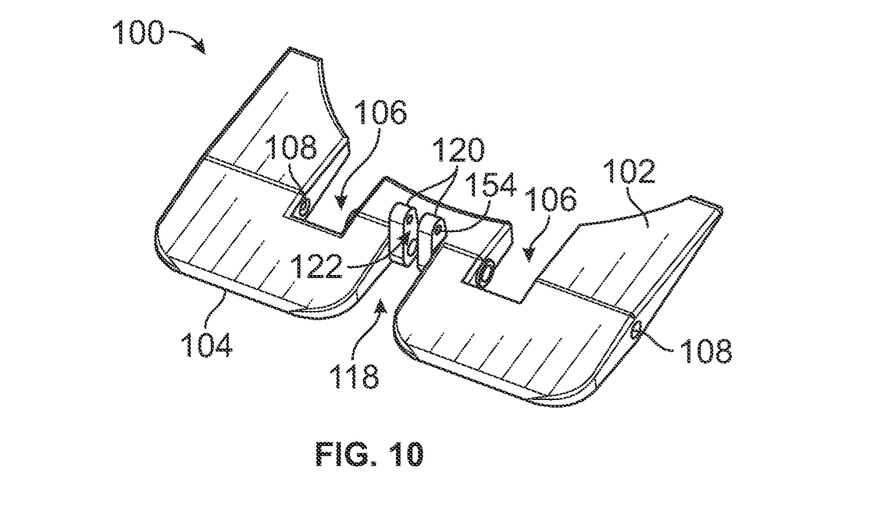
FIG. 10 illustrates a perspective view of an elevator employed within the fishing aid of FIGS. 1-4.
Figure 11A:
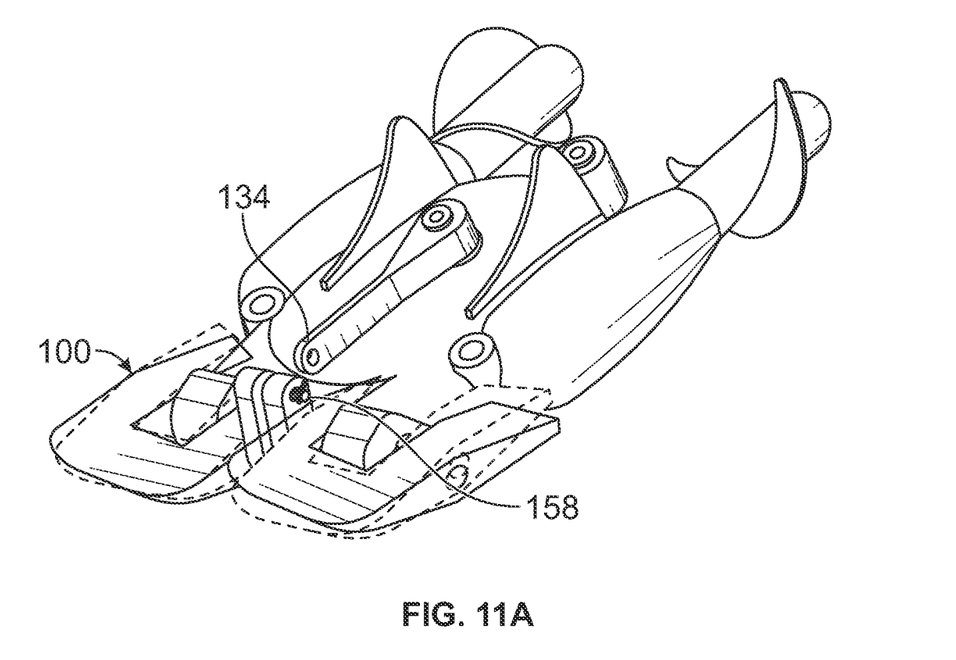
FIG. 11A illustrates a perspective view of the exemplary fishing aid with the elevator being shown in a position of moving the fishing aid in an upward direction.
Figure 11B:
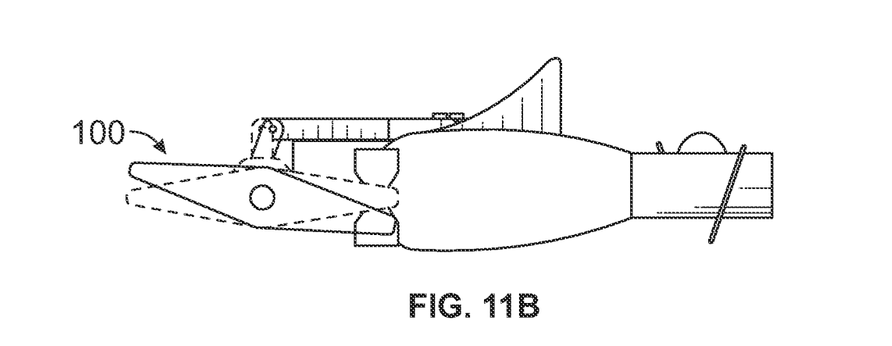
FIG. 11B illustrates a side view of the exemplary fishing aid of FIG. 11A.
Figure 12A:
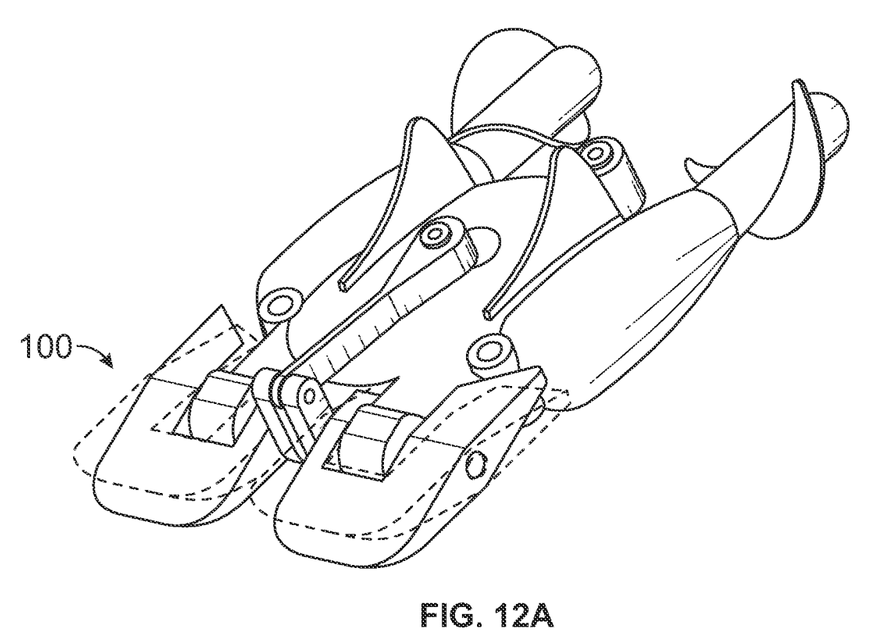
FIG. 12A illustrates a perspective view of the exemplary fishing aid with the elevator being shown in a position of moving the fishing aid in a downward direction.
Figure 12B:
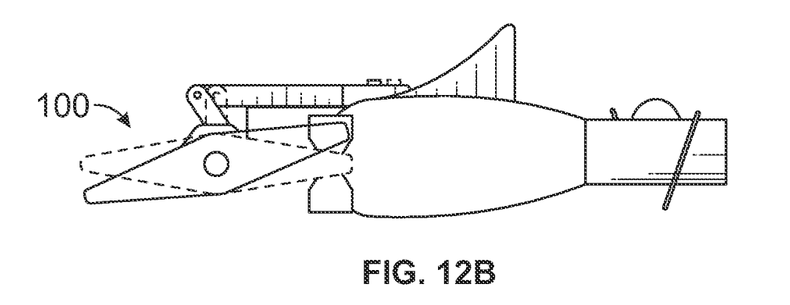
FIG. 12B illustrates a side view of the exemplary fishing aid of FIG. 12A.

As is illustrated in FIG. 10, the elevator 100 defines a proximal edge 102 and a distal edge 104. The proximal edge 102 may have a shape that is complimentary to the shape of the peripheral edge 28. When the housing 20 is provided as a generally circular housing 20, the proximal edge 102 has a concave shape. The elevator 100 comprises two notches 106. The notches 106 are disposed at a distance with each other and in an open communication with the proximal edge 102. The distance between the notches 106 is so sized that each notch 106 receives the above-described flange 54. An elevator aperture 108 is formed through a thickness of the elevator 100. Furthermore, a longitudinal axis of the elevator aperture 108 is disposed parallel to the distal edge 104. During use, this elevator aperture 108 is axially aligned with flange apertures 109 through a thickness of each flange 54.

In this arrangement, the elevator 100 can be pivotally connected to the housing 20 with a rod-shaped member 110 passed through the aligned elevator aperture 108 and flange apertures 109. It is to be understood that the elevator aperture 108 and flange apertures 109 and the rod-shaped member 110 define a pivotal connection 114 between the elevator 100 and the housing 20. In other words, the fishing aid 10 comprises a pivotal connection between the elevator 100 and the housing 20. The rod-shaped member 110 defines pivoting axis 116 of the pivotal connection 114. It is to be further understood that the flanges 54 with flange apertures 109, notches 106, elevator aperture 108 and the rod-shaped member 110 define a pivotal connection 114 between the elevator 100 and the housing 20. The elevator 100 may comprise a notch 118 in an open communication with the distal edge 104. The elevator 100 may comprise a pair of tabs 120 extending from one surface of the elevator 100 and being disposed at a distance from each other to define a gap 122.

Figure 1:
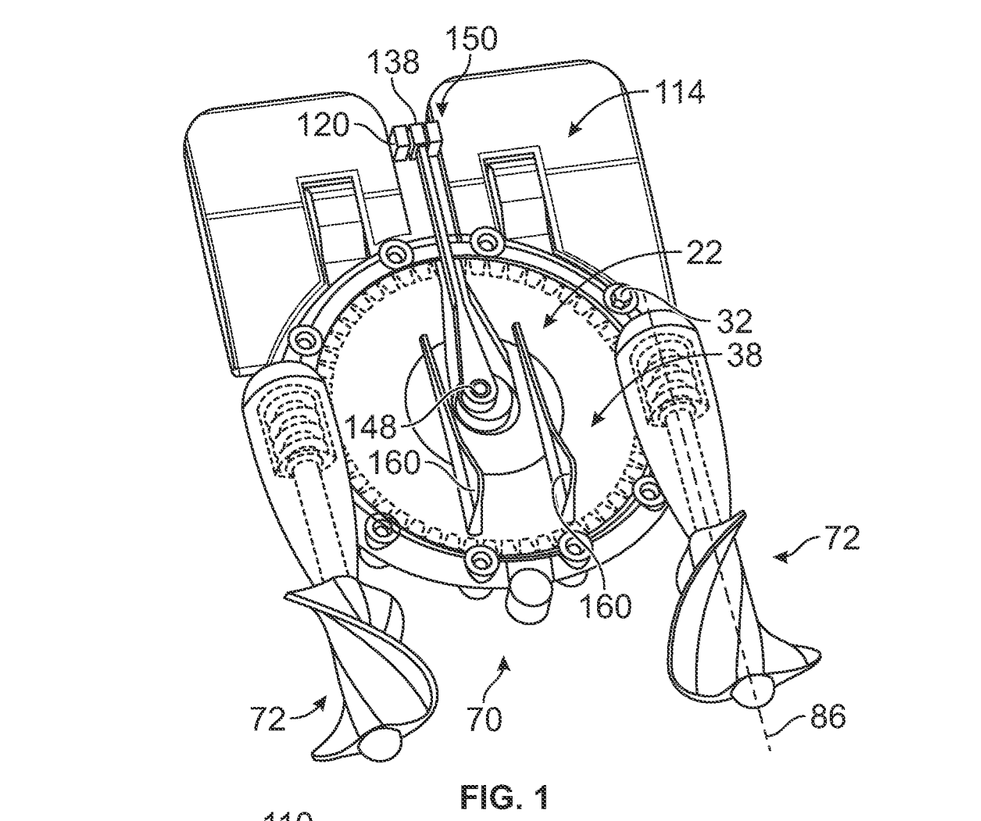
FIG. 1 illustrates a top perspective view of an exemplary fishing aid.
Figure 2:
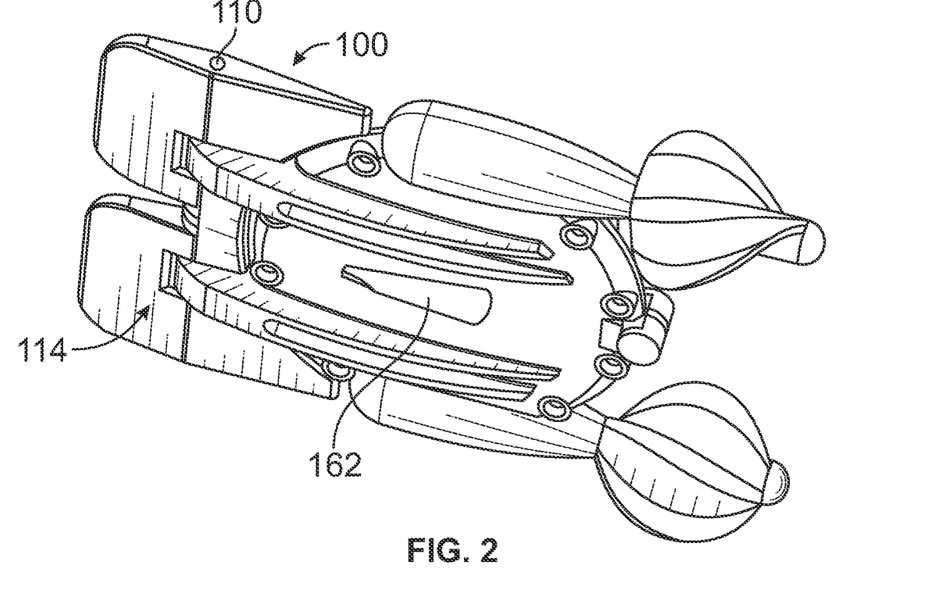
FIG. 2 illustrates a bottom perspective view of the exemplary fishing aid of FIG. 1.
Figure 3:
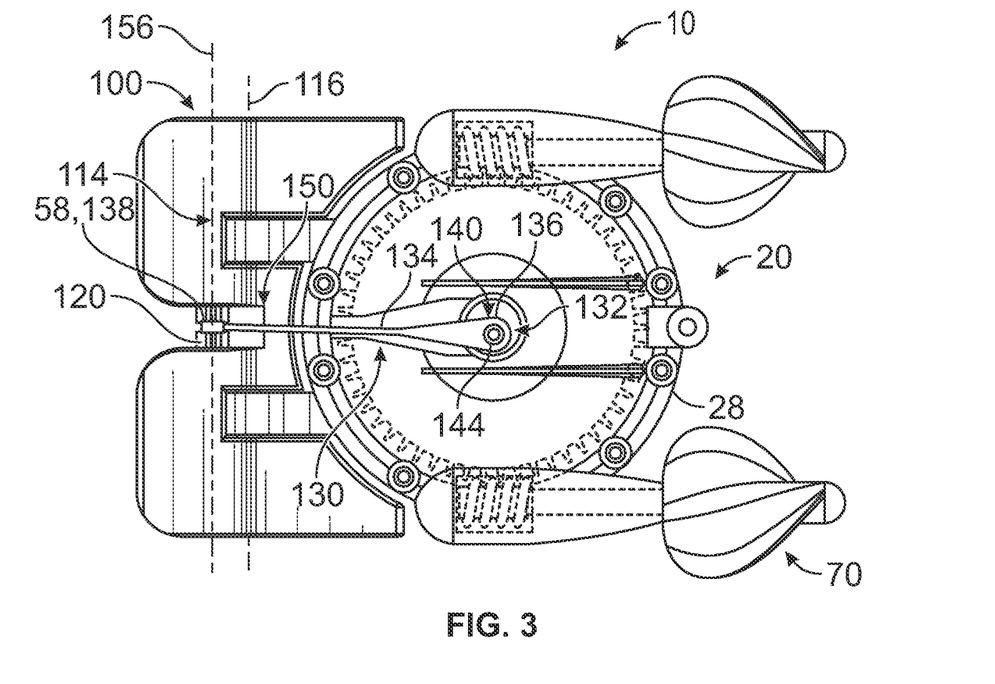
FIG. 3 illustrates a top view of the exemplary fishing aid of FIG. 1.
Figure 4:
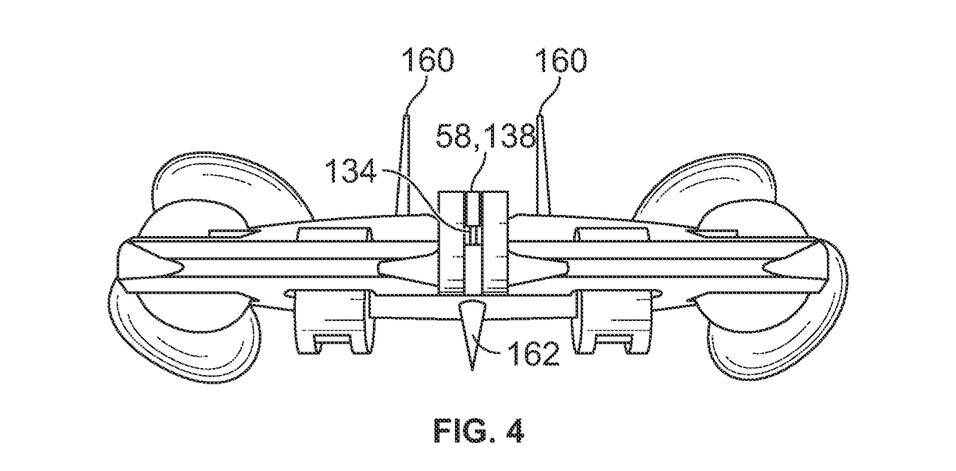
FIG. 4 illustrates a front view of the exemplary fishing aid of FIG. 1.

Now in a reference to FIGS. 1 and 3, the fishing aid 10 comprises a coupling connection 130 between the elevator 100 and the actuator 70. Such coupling connection 130 comprises a pushrod 134, an eccentric connection 132 between the pushrod 134 with the actuator 70 and a pivotal connection 150 between the pushrod 134 and the elevator 100. The pushrod 134 comprises two ends 136 and 138. The two ends 136 and 138 are being spaced apart from each other along a length of the pushrod 134.

The eccentric connection 132 comprises a rotational connection 140 between one end, illustrated as the end 136, of the pushrod 134 and the actuator 70. More specifically, the rotational connection 140 is between the end 136 of the pushrod 134 and the end 94 of the shaft 90. The axis 142 of such rotational connection 140 is offset from the axis 44 of the gear 96 and the shaft 90. In a non-limiting example, the rotational connection 140 can comprise an aperture 144 through the end 136, a bore 146 in the end 94 and a pin 148 that is passed through aperture 144 and received within the bore 146. The pin 148 can comprise a fastener, where the bore 146 is then provided as a threaded bore 146. Thus, the eccentric connection 132 defines a crankshaft configuration of the shaft 90.

The coupling connection 130 comprises a pivotal connection 150 between another end 138 of the pushrod 134 and the pair of tabs 120 of the elevator 100. In a non-limiting example, the end 138 is adapted with a pushrod aperture 152 and each tab 120 is adapted with a mounting aperture 154. The pushrod aperture 152 and the mounting aperture 154 are axially aligned therebetween along a pivoting axis 156 of the pivotal connection 150 so that a pin 158 can pass though the pushrod aperture 152 and the mounting aperture 154 when the end 138 is received within the gap 122. The pivoting axis 156 is disposed normal to the axis 142 and parallel to the pivoting axis 116. The pivoting axis 156 is being further offset outwardly from the pivoting axis 116.

In operation, as the shaft 90 rotates, the end 136 of the pushrod 134 rotates eccentrically in a relationship to the axis 44 of the shaft 90 through the eccentric connection 132. This eccentric connection 132 causes the pushrod 134 to either push the pivotal connection 150 away from the axis 44 or pull the pivotal connection 150 toward the axis 44. The pivotal connection 150 further allows the pushrod 134 to pivot relative to the tabs 120. Since the elevator 100 is also in the pivotal connection 114 with the housing 20, the proximal edge 102 and the distal edge 104 reciprocally move in a vertical direction. As the pushrod 134 pushes the pivotal connection 150 away from the axis 44, the distal edge 104 moves downwardly in the generally vertical direction. As the pushrod 134 pulls the pivotal connection 150 toward the axis 44, the distal edge 104 moves upwardly in the generally vertical direction. Thus, the pushrod 134 is operable to reciprocally move the distal edge 104 of the elevator 100 in a generally vertical direction toward to and away from a surface 4 of the body of water 2 during the use of the fishing aid 10 being pulled by the line through the body of water 4 in the linear direction.

Thus, it will be understood that the elevator 100 changes the positional orientation in the generally vertical direction during use of the fishing aid 10. In one (first) terminal position of FIGS. 11A-11B, the distal edge 104 is higher than the proximal edge 102. In another (second) terminal position of FIGS. 12A-12B, the distal edge 104 is lower than the proximal edge 102. In other words, the elevator 100 reciprocally moves between two terminal positions. In each terminal position, the elevator 100 is inclined in a relationship to a plane of the housing 20. In each terminal position, the elevator 100 is further inclined in a relationship to axis of each propeller 72. During such reciprocal movement, the elevator 100 moves through an intermediate position where the distal edge 104 is aligned, in a generally horizontal plane, with the proximal edge 102 and is further aligned, in such generally horizontal plane, with the housing 20 and the axis 86 of each propeller 72. The distal edge 104 of the elevator 100 can be also referred to in this document as a free edge 104. Even when the fishing aid 10 being partially submerged, the proximal edge 102 of the elevator 100, a portion of the elevator 100, including the proximal edge 102, will be submerged in the body of water 2 in the first terminal position. In the second terminal position, a portion of the elevator 100, including the distal edge 104, will be submerged in the body of water 2 in the second terminal position. Thus, even when the fishing aid 10 is on the body of the water 2 and being partially submerged, the reciprocal vertical motion of the elevator 100 will cause the movement of the fishing aid in the non-linear pattern. Although the elevator 100 has been illustrated as a one-piece member, it can be provided as two separate halves, each in a respective coupling and pivoting alignment with the actuator 70.

The non-linear pattern may resemble a sinusoidal pattern, or a sign wave, with a vertical element where a lower apex represents the distal edge 104 being higher than the proximal edge 102 in the first terminal position and where the upper apex represents the distal edge 104 being lower than the proximal edge 102 in the second terminal position. It would be understood that the greater the distance between the proximal edge 102 and the distal edge 104, the greater the distance is between the upper apex and the lower apex or, in other words, the greater the amplitude of the sign wave.

Thus, it can be seen from the above that the coupling connection comprises a pushrod in a first connection with the actuator and in a second connection with the elevator, the pushrod configured to reciprocally move a distal edge of the elevator in a vertical direction toward to and away from a surface of the body of water during the use of the fishing aid being pulled through the body of water in the linear direction.

The fishing aid 10 can further comprise two stabilizing members 160 on the exterior surface 34 of the housing 20. When provided, the two stabilizing members 160 are being disposed above the housing 20 during use of the fishing aid 10 and in a spaced apparat relationship from each other. During use, the stabilizing members 160 function to improve reliability in orientation of the fishing aid 10 when cast into the body of water 2. The stabilizing members 160 may also improve buoyancy and vertical plane orientation reliability of the fishing aid 10. A single stabilizing member 160 may be used within the fishing aid 10. The single stabilizing member may be centered on the housing 20. The stabilizing member 160 may be referred to as a fin.

The fishing aid 10 may further comprise a keel 162 on the exterior surface 34 of the housing 20. When provided, the keel 162 is being disposed below the housing 20 during use of the fishing aid 10. When provided, the keel 162 functions to improve (increase) orientation reliability of the fishing aid 10 during use when cast into the body of water 2. When provided, the keel 162 also functions to improve stability of the fishing aid 10.

The stabilizing member 160 and keel 162 may be provided independently from each other or in a combination with each other. In other words, the fishing aid may comprise one of the stabilizing member 160, the keel 162 and a combination thereof.

The fishing aid 10 comprises a connection to a fishing implement 6. This connection may be axially aligned with the pivoting axis 116 of the pivotal connection 114. The connection may comprise a line. The line can be referred to as a fishing line or a trolling line.

Figure 13:
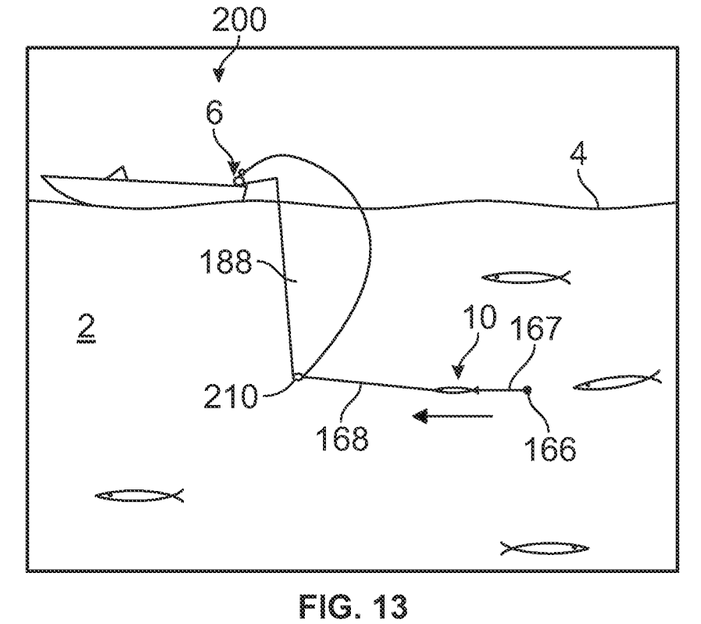
FIG. 13 is an environmental view of using the fishing aid of FIGS. 1-12B.
Figure 14:
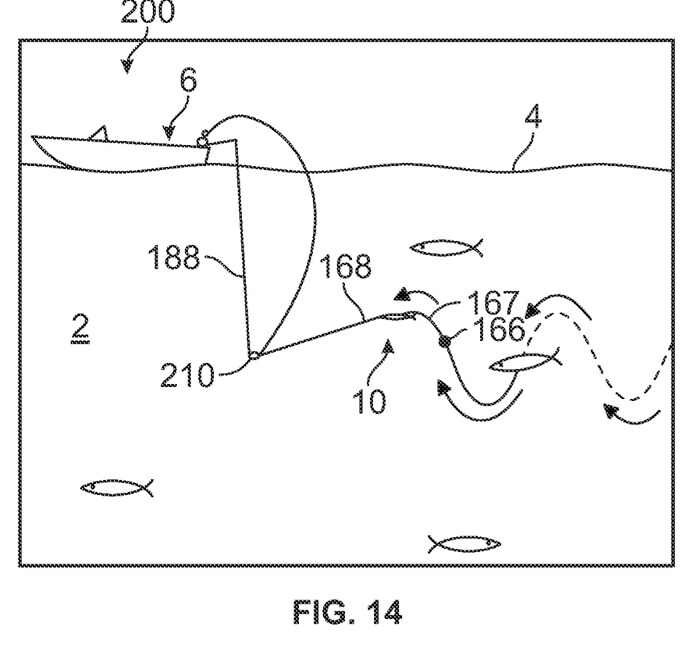
FIG. 14 is an environmental view of using the fishing aid of FIGS. 1-12B.
Figure 15:
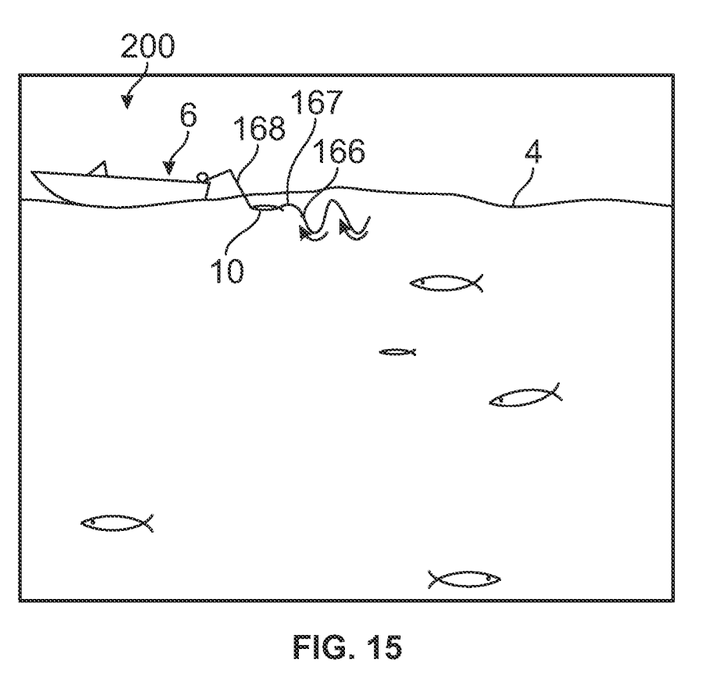
FIG. 15 is an environmental view of using the fishing aid of FIGS. 1-12B.

Now in a reference to FIGS. 13-15, therein is illustrated a fishing assembly 200. The fishing assembly 200 may comprise a fishing aid 10, a line 168 that connects the fishing aid 10 to a fishing implement 6, a lure 166 and a line 167 attaching the lure 166 to the fishing aid 10. The fishing implement 6 can be a fishing rod. The fishing implement 6 can be a fishing rod supported on a boat. The fishing implement 6 can be a boat with the line 168 being connected directly to the boat. The lure 166 can comprise a fish hook. The fish hook can hold a bait.

The present disclosure teaches a fishing assembly 200 that comprises a fishing aid 10, a downrigger 210, a line 168 that connects the fishing aid 10 to the downrigger 210, a line 188 that connects the downrigger 210 to the fishing implement 6, a lure 166 and a line 167 attaching the lure 166 to the fishing aid 10. The fishing implement 6 can be a fishing rod. The fishing implement 6 can be a fishing rod supported on a boat. The fishing implement 6 can be a boat with the line 168 being connected directly to the boat. The lure 166 can comprise a fish hook. The fish hook can hold a bait. The lines 168 and 188 can be referred to as fishing lines or trolling lines.

A method of fishing can comprise submerging a fishing aid 10 into a body of water 2, the fishing aid 10 being configured to move in a non-linear pattern relative to a surface 4 of the body of water 2 when being submerged in the body of water 2 and while being pulled through the body of water 2 in a linear direction by a line 168 connected to the fishing aid 10; pulling the fishing aid 10 through the body of water 2 in the linear direction; and moving the fishing aid 10 in the non-linear pattern. Pulling the fishing aid 10 can comprise pulling the fishing aid 10 with a fishing implement 6. The method of fishing can additionally comprise connecting the fishing aid 10 to a downrigger 210 and connecting the downrigger 210 to the fishing implement 6. Moving the fishing aid 10 in the non-linear pattern may comprise using a rotational propeller motion to reciprocally move an elevator 100 in a generally vertical plane or direction, where the elevator 100 is pivotally connected to a housing of the fishing aid 10. Moving the fishing aid 10 may comprise rotating a gear 96 with the propeller 72 and actuating, with the gear 96, a pushrod 134, the pushrod 134 being in an eccentric connection with the gear 96 and in a pivotal connection with the elevator 100.

When trolling for fish in large bodies of water, some fishermen use downriggers to reach 20 feet to 200 feet. For example, when fishing for salmon and trout in deep, fresh water lakes, fishermen commonly troll at 60-foot depths or more. While being trolled on a calm day, at a chosen boat speed the lure is presented near the depth of the downrigger ball. Fishermen often troll using multiple lines with lures presented at different depths. Fish often school together and are concentrated at certain depths. Successful fishermen identify depths where the fish are, in order to increase the odds of catching a fish. On days when the lake is flat with hardly any waves, the trolled baits do not change depth. The downrigger balls stay at the depth they are set, and the baits that are trolled behind reach equilibrium and travel in a straight line. On windy days, the downrigger ball oscillates with the boat that is riding the waves.

Bait fish, when being chased by much larger fish, often dive lower and try to make it into the weeds or the rocks below to be protected or hidden and avoid capture. Also, bait fish, when being chased by much larger fish, often climb towards the surface, sometimes even jumping out of the water. The above described fishing aid 10 provides motion in the vertical plane attempting to simulate escaping bait fish.

Fishing aid 10 may improve a total vertical area that the lure is presented within. When first considering a conventional lure that is being trolled at a constant speed from a boat that is traveling on water with no waves, most conventional lures will stay within about 2 feet of vertical travel while being trolled. The above described fishing aid 10 provides a non-linear pattern motion with a vertical element, which fisherman today cannot achieve without pumping the fishing implement up/down or use other means. The above described fishing aid 10 may typically travel within a range of about 20 feet of vertical travel while being trolled. Thus, the above described fishing aid 10 may also expand a vertical fishing range due to this non-linear pattern.

The sinusoidal action also improves the chances of catching a fish because of the above described fishing aid 10 covering a larger vertical range over the water that the boat is trolling, and the above described fishing aid 10 more resembles the motion of an escaping bait fish as it is diving or rising to escape capture.

The fishing aid 10 can be used in various applications. The fishing aid 10 can be used as a lure connected to the fisherman's line when the fishing aid 10 is being partially submerged. The fishing aid 10 can be used as a planer board, connected to the fisherman's line, with the fisherman's lure attached to the rear of the planer board when the fishing aid 10 being partially submerged. The fishing aid 10 can be used as a lure connected to the downrigger ball. The fishing aid 10 can be used as a planer hoard but connected to the fisherman's line, which connects to a release that is connected to the downrigger ball. The fisherman's lure is attached to the rear of the planer board. The fishing aid 10 can be used as a planer board connected to the downrigger ball with a leader line. A release mechanism can be affixed to the planer hoard in the rear of the bait. The fisherman's lure is then connected to the release, and the fisherman's favorite lure is pulled through the water in a sinusoidal pattern. When a fish strikes, the line escapes the spring-loaded release and the fish, lure and fisherman are free of the planer board.

The present disclosure teaches a fishing aid that may comprise a housing with a hollow interior; an actuator, the actuator being coupled to the housing; and an elevator, the elevator being in a pivotal connection with the housing and being in a coupling connection with the actuator, such that the elevator is configured, through the actuator, for a reciprocally pivotal movement in a vertical direction when the fishing aid is being pulled in a linear direction through a body of water by a line connected to the housing; the reciprocal pivotal movement of the elevator causing a movement of the fishing aid in a non-linear pattern through the body of water.

The actuator may comprise two propellers, each propeller from the two propellers comprising a gear engaging portion disposed within the hollow interior, a middle portion extending from the gear engaging portion, the middle portion being mounted for a rotation within the hollow interior, and a helix-shaped portion extending from the middle portion and extending outwardly from the housing, the helix-shaped portion being disposed in the rear of the housing during use of the fishing aid, the helix-shaped portion comprising two fins, each of the two fins comprising a flute shape, a gear engaging portion of a first propeller rotating in a direction being opposite to a direction of rotation of a gear engaging portion of a second propeller, the helix-shaped portion generating a rotation of the each propeller and a rotation of the gear engaging portion due to a reaction with the body of water while being pulled through the body of water in a linear direction when the fishing aid is being submerged in the body of water and while being pulled through the body of water; a shaft disposed within the hollow interior of the housing; and a gear mounted on the shaft within the hollow interior for a rotation with the shaft, the gear comprising a disk-shaped body and gear teeth on a peripheral edge surface of the disk-shaped body, the gear engaging portion configured to engage the teeth; the gear rotating due to the rotation of each propeller during the use of the fishing aid being pulled through the body of water.

The pivotal connection may comprise two flanges on an exterior surface of the housing; two notches in a proximal edge of the elevator, each notch from the two notches being sized and shaped to receive a respective flanges therewithin; an aperture through a thickness of the elevator; an aperture through each flange, the aperture through each flange is aligned with the aperture through the thickness of the elevator; and a pin, the pin passed through the aperture through each flange and through the aperture through the thickness of the elevator; the pin defining a pivoting axis of the pivotal connection.

The pivoting axis may be coaxial with a front line-tie location on the fishing aid.

The coupling connection may comprise a pushrod comprising two ends, the two ends being spaced apart from each other along a length of the pushrod; an eccentric connection between one end of the pushrod and the actuator; and a pivotal connection between another end of the pushrod and the elevator; the pushrod operable to reciprocally move a distal edge of the elevator in a vertical direction toward to and away from a surface of the body of water during the use of the fishing aid being pulled through the body of water in the linear direction.

The eccentric connection may comprise an aperture through the one end of the pushrod; a bore in an end of a crankshaft embodiment in the actuator; and a pin passed through the aperture and received within the bore, the pin defining a pivoting axis of the eccentric connection.

The pivotal connection may comprise two tabs upstanding on a surface of the elevator, the tabs being spaced from each other to define a gap; an aperture through a thickness of each tab; an aperture through another end of the pushrod, another end being received within the gap; and a pin, the pin passed through the aperture through each tab and through the aperture through another end; the pin defining a pivoting axis of the pivotal connection.

The coupling connection may comprise a pushrod in a first connection with the actuator and in a second connection with the elevator, the pushrod configured to reciprocally move a distal edge of the elevator in a vertical direction toward to and away from a surface of the body of water during the use of the fishing aid being pulled through the body of water in the linear direction.

The reciprocal pivotal movement may comprise a reciprocal movement of a free end of the elevator in a vertical direction.

The fishing aid may further comprise two stabilizing fins on an exterior surface of the housing, the two stabilizing fins being disposed above the housing during use of the fishing aid.

The fishing aid may further comprise a stabilizing keel on an exterior surface of the housing, the stabilizing keel being disposed below the housing during use of the fishing aid.

The fishing aid may further comprise a lure connection which is disposed in the rear of the housing between the two propellers of the actuator.

The fishing aid may further comprise a line connection on an exterior surface of the housing.

The fishing aid may further comprise a downrigger disposed within a body of water during use of the fishing aid, the downrigger comprising a connection with a trolling line; a first line connection between the fishing aid and the downrigger; and a second line connection between the fishing aid and a fish hook.

The fishing aid may further comprise a fishing line; a first line connection between the fishing aid and the fishing line; and a second line connection between the fishing aid and a fish hook.

The present disclosure teaches a fishing aid that may comprise a housing, the housing comprising two wall haves, the two wall halves being fastened, at assembly, to each other with fasteners at a peripheral edge of the housing, the two wall halves defining an exterior surface of the housing and an interior surface of the housing, the interior surface defining a hollow interior of the housing, an aperture through a thickness of one wall half, a central bore in a thickness of another half, the central bore being in an open communication with the hollow interior, the bore being axially aligned with the aperture, and two extensions that are disposed at a distance from each other about the peripheral edge, each extension from the two extensions comprising an inner opening in an open communication with the hollow interior, an outer opening being in an open communication with the exterior surface, and an inner bore that is disposed between the inner opening and the outer opening; two propellers, each propeller from the two propellers comprising a gear engaging portion disposed within the inner opening and protruding into the hollow interior, a middle portion extending from the gear engaging portion, the middle portion being mounted for a rotation within the inner bore, and a helix-shaped portion extending from the middle portion and extending outwardly, through the outer opening, from the housing, the helix-shaped portion being disposed in the rear of the housing during use of the fishing aid, the helix-shaped portion comprising two fins, each of the two fins comprising a flute shape, a gear engaging portion of a first propeller rotating in a direction being opposite to a direction of rotation of a gear engaging portion of a second propeller; a shaft disposed within the hollow interior of the housing; a gear mounted for a rotation on the shaft within the hollow interior, the gear comprising a disk-shaped body and gear teeth on a peripheral edge surface of the disk-shaped body, the gear engaging portion configured to engage the teeth; an elevator comprising a proximal edge and a distal edge, the elevator being disposed at a rear of the fishing aid during the use thereof; a first pivotal connection between the proximal edge of the elevator and an exterior surface of the side wall of the housing, the first pivotal connection comprising two flanges on an exterior surface of the housing, two notches in a proximal edge of the elevator, each notch from the two notches being sized and shaped to receive a respective flanges therewithin, an aperture through a thickness of the elevator, an aperture through each flange, the aperture through each flange is aligned with the aperture through the thickness of the elevator, and a first pin, the first pin being passed through the aperture through each flange and through the aperture through the thickness of the elevator, the first pin defining a pivoting axis of the first pivotal connection a pushrod, a rotational connection between sad pushrod and an end surface of the shaft, the end surface accessible from the first surface of the housing, the rotational connection comprising an aperture through the one end of the pushrod, a bore in the end surface of the shaft, and a second pin, the second pin being passed through the aperture and received within the bore, the second pin defining a pivoting axis of the rotational connection, an axis of the rotational connection being offset from a rotational axis of the gear; a second pivotal connection between the pushrod and the elevator, the second pivotal connection comprising two tabs upstanding on a surface of the elevator, the tabs being spaced from each other to define a gap, an aperture through a thickness of each tab, an aperture through another end of the pushrod, another end being received within the gap, and a third pin, the third pin being passed through the aperture through each tab and through the aperture through another end, the third pin defining a pivoting axis of the second pivotal connection; one or more stabilizing fins on the first exterior surface of the housing, the one or more stabilizing fins being disposed above the housing during the use of the fishing aid; a stabilizing keel on the second exterior surface of the housing, the stabilizing keel being disposed below the housing during the use of the fishing aid; a lure connection disposed in the rear of the housing between the two propellers of the actuator, the lure connection being coaxial with an axis of the first pivotal connection; and a line connection on the exterior surface of side wall of the housing, the line connection disposed between the helix-shaped portions; the helix-shaped portion generating a rotation of the each propeller and a rotation of the gear engaging portion due to a reaction with a body of water while being pulled through the body of water when the fishing aid being submerged in the body of water and while being pulled through the body of water by a trolling line connected to the line connection; the gear rotating due to the rotation of each propeller during use of the fishing aid being submerged in the body of water and while being pulled through the body of water by the line connected to the trolling connection; the pushrod rotating due to the gear rotation through the second pivotal connection; the distal edge being adapted for a reciprocal movement in a vertical direction toward to and away from a surface of a body of water during the use of the fishing aid when the fishing aid being submerged in the body of water and while being pulled through the body of water by a trolling line connected to the line connection, the reciprocal movement caused by a rotation of each of the each propeller, the gear and the pushrod; the reciprocal movement of the elevator causing a movement of the fishing aid in a sinusoidal-shaped pattern relative to the surface of the body of water when being submerged in the body of water and while being pulled through the body of water by the line connected to the line connection.

The present disclosure teaches a fishing aid may comprise a housing; a gear mounted on a shaft for a rotation within the housing; two propellers configured to counter rotate during use of the fishing aid, each of the two propellers engages the gear and causes a rotation thereof due to a reaction with a body of water while being pulled therethrough in a linear direction; an elevator pivotally connected to the housing; and a pushrod in a first connection with the shaft and in a second connection with the elevator, the pushrod configured to reciprocally move a distal edge of the elevator in a vertical direction toward to and away from a surface of a body of water during the use of the fishing aid being pulled through the body of water in a linear direction; a reciprocal movement of the distal edge of the elevator causing a movement of the fishing aid in a sinusoidal-shaped pattern relative to the surface of the body of water when the fishing aid is being submerged in the body of water and while being pulled through the body of water by a line connected to the fishing aid.

The present disclosure teaches a fishing aid that may comprise a housing; an elevator, the elevator comprising a proximal edge and a distal edge, the distal edge being spaced apart from the proximal edge to define a width of the elevator; a pivotal connection between the proximal edge and the housing; an actuator; and an eccentric rotational connection between the actuator and the elevator; the distal edge configured to reciprocally move in a vertical direction toward to and away from a surface of a body of water when the fishing aid is being pulled in a linear direction through the body of water; a reciprocal movement of the distal edge causing a movement of the fishing aid in a non-linear pattern.

The present disclosure teaches a fishing assembly that may comprise a downrigger disposed within a body of water during use of the fishing assembly, the downrigger comprising a connection with a trolling line; a fishing aid; a first line connection, during use of the fishing assembly, between the fishing aid and the downrigger; and a second line connection, during the use of the fishing assembly, between the fishing aid and a fish hook; the fishing aid being configured to move in a non-linear pattern relative to a surface of a body of water while being pulled through the body of water in a linear direction through the first line connection when the downrigger is connected to the trolling line.

The present disclosure teaches a fishing assembly that may comprise a fishing line; a fishing aid; a first line connection, during use of the fishing assembly, between the fishing aid and the fishing line; and a second line connection, during the use of the fishing assembly, between the fishing aid and a fish hook; the fishing aid configured to move in a non-linear pattern relative to a surface of a body of water while being pulled through the body of water in a linear direction by the fishing line.

The present disclosure teaches a method of fishing that may comprise submerging a fishing aid into a body of water, the fishing aid being configured to move in a non-linear pattern relative to a surface of the body of water when being submerged in the body of water and while being pulled through the body of water in a linear direction by a fishing line connected to the fishing aid; pulling the fishing aid through the body of water in the linear direction; and moving the device in the non-linear pattern.

What is claimed is:

1. A fishing aid, comprising:
a housing with a hollow interior and at least one aperture;
an actuator within the housing;
an elevator with a pivotal connection to the housing and a coupling connection to the actuator;
the coupling connection between the elevator and the actuator further comprises a pushrod comprising two ends, the two ends being spaced apart from each other along a length of the pushrod, with an eccentric connection between one end of the pushrod and the actuator;
the coupling connection of the elevator to the actuator further comprises a pivotal connection between another end of the pushrod and the elevator;
the pushrod operable to reciprocally move a distal edge of the elevator in a vertical direction along the pivotal connection between the elevator and the housing, toward and away from a surface of a body of water when the fishing aid is being pulled through the body of water in the linear direction by a line connected to the fishing aid;
the pivotal connection of the coupling connection of the elevator to the actuator comprises two tabs upstanding on a surface of the elevator, the tabs being spaced from each other to define a gap;
an aperture through a thickness of each tab;
an aperture through the another end of the pushrod, the another end being received within the gap;
a pin, the pin passed through the aperture through the each tab and through the aperture through the another end;
the pin defining a pivoting axis of the pivotal connection of the coupling connection of the elevator to the actuator;
the actuator being oriented behind the elevator in relation to the direction of the fishing aid being pulled through the body of water; and
the reciprocal pivotal movement of the elevator causes a movement of the fishing aid in a non-linear pattern through the body of water.

2. The fishing aid of claim 1, wherein the actuator comprises:
two propellers within the hollow interior and extending through the at least one aperture;
each propeller of the two propellers having a gear engaging portion disposed within the hollow interior of the housing,
a middle portion extending from the gear engaging portion and being mounted for a rotational movement within the hollow interior, and
a helix-shaped portion extending from the middle portion and extending outwardly from the housing to be exposed to the body of water during use of the fishing aid;
the two propellers, of opposite helix angle rotation relative to each other; causing the two gear engaging portions to rotate in opposite directions;
the actuator including a gear with a disk-shaped body having a rotational axis and gear teeth on a peripheral edge surface of the disk-shaped body, and
the gear engaging portion configured to engage the gear teeth; and
the coupling connection of the elevator with the pivotal connection to the housing to the actuator being to the rotational axis of the disk-shaped body of the gear.

3. The fishing aid of claim 1, wherein the actuator comprises:
a shaft mounted for a rotation within the hollow interior;
a gear mounted on the shaft for the rotation therewith; and
two counter-rotating propellers mounted within the hollow interior perpendicular to the rotation of the shaft of the actuator and in a meshing engagement with the gear; and
the gear of the actuator rotating on the rotational axis through the meshing engagement with the gear of the two propellers during the use of the fishing aid being pulled through the body of water.

4. The fishing aid of claim 1, wherein the pivotal connection between the elevator and the housing further comprises:
two flanges on an exterior surface of the housing;
two notches in a proximal edge of the elevator, each notch from the two notches being sized and shaped to receive a respective flange each, of the two flanges, therewithin;
an aperture through a thickness of the elevator;
an aperture through each respective flange, the aperture through the each respective flange is aligned with the aperture through the thickness of the elevator; and
a pin, the pin being through the aperture through the each respective flange and through the aperture through the thickness of the elevator;
the pin defining a pivoting axis of the pivotal connection between the elevator and the housing.

5. The fishing aid of claim 1, wherein the eccentric connection between the end of the pushrod and the actuator further comprises:
an aperture through the one end of the pushrod;
a crankshaft in the actuator with a bore in an end; and
a pin passed through the aperture and received within the bore, the pin defining a pivoting axis of the eccentric connection.

6. The fishing aid of claim 1, wherein the coupling connection comprises the pushrod in a first connection with the actuator and in a second connection with the elevator, the pushrod configured to reciprocally move the distal edge of the elevator in the vertical direction toward to and away from the surface of the body of water during the use of the fishing aid being pulled through the body of water in the linear direction.

7. The fishing aid of claim 1, wherein the reciprocal pivotal movement comprises a reciprocal movement of a free end of the elevator in a vertical direction.

8. The fishing aid of claim 1, further comprising two stabilizing fins on an exterior surface of the housing, the two stabilizing fins being disposed above the housing during use of the fishing aid.

9. The fishing aid of claim 1, further comprising a stabilizing keel on an exterior surface of the housing, the stabilizing keel being disposed below the housing during use of the fishing aid.

10. The fishing aid of claim 1, further comprising a lure connection with the housing.

11. The fishing aid of claim 1, further comprising a fishing implement connection with the housing.

12. The fishing aid of claim 1, further comprising:
a downrigger disposed within a body of water during use of the fishing aid, the downrigger comprising a connection with a trolling line;
a first line connection between the fishing aid and the downrigger; and
a second line connection between the fishing aid and a fish hook.

13. The fishing aid of claim 1, further comprising:
a fishing line;
a first line connection between the fishing aid and the fishing line; and
a second line connection between the fishing aid and a fish hook.

* * * * *